United States Patent
Kitagawa et al.

(10) Patent No.: US 7,375,615 B2
(45) Date of Patent: May 20, 2008

(54) PERSONAL AUTHENTICATION SYSTEM

(75) Inventors: Kenji Kitagawa, Yokohama (JP); Motoaki Satoyama, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 175 days.

(21) Appl. No.: 11/147,246

(22) Filed: Jun. 8, 2005

(65) Prior Publication Data

US 2005/0278776 A1 Dec. 15, 2005

(30) Foreign Application Priority Data

Jun. 10, 2004 (JP) .............................. 2004-171999

(51) Int. Cl.
*G06F 11/00* (2006.01)
(52) U.S. Cl. ..................... 340/5.81; 713/168; 713/182; 726/20; 340/5.61; 340/5.74
(58) Field of Classification Search ............... 340/5.81, 340/5.8, 10.1, 10.42, 5.74, 5.61; 726/3, 17, 726/18, 19, 20; 713/168, 182
See application file for complete search history.

(56) References Cited

U.S. PATENT DOCUMENTS

| | | | | |
|---|---|---|---|---|
| 6,070,240 | A * | 5/2000 | Xydis ........................... | 726/17 |
| 6,189,105 | B1 * | 2/2001 | Lopes ........................... | 726/20 |
| 6,845,453 | B2 * | 1/2005 | Scheidt et al. .................. | 726/5 |
| 2003/0005300 | A1 * | 1/2003 | Noble et al. .................. | 713/172 |
| 2003/0149874 | A1 * | 8/2003 | Balfanz et al. ............. | 713/168 |
| 2004/0230797 | A1 * | 11/2004 | Ofek et al. .................. | 713/168 |
| 2005/0102042 | A1 * | 5/2005 | Reynard et al. .............. | 700/17 |

FOREIGN PATENT DOCUMENTS

JP 2003-288328 10/2003

* cited by examiner

*Primary Examiner*—Edwin C. Holloway, III
*Assistant Examiner*—Yong Hang Jiang
(74) *Attorney, Agent, or Firm*—Antonelli, Terry, Stout & Kraus, LLP.

(57) ABSTRACT

An apparatus is disclosed for reducing the vexatious complication of personal authentication when using an information technology device or a card. A combination of RFID tags worn by a user is stored when personal authentication is carried out. The RFID tags are detected again In a situation where personal authentication is required. The continuous use of the previous personal authentication is permitted depending on the extent of coincidence between pieces of RFID information thus detected and the combination of stored RFID information, so that further authentication operations can be omitted. In addition, reference is made to a past archive when an RFID list is created. A weighted coefficient is then calculated based on the put-on frequency (put-on archive) in terms of a user's single article or a combination of such articles. The utilization of the weighted coefficient provides personal authentication with a high level of reliability.

20 Claims, 7 Drawing Sheets

| Discrimination ID | Classification | Put-on co-efficient | Put-off frequency | Put-on frequency | Pairing information |
|---|---|---|---|---|---|
| 00000101 | Shoes | 2 | 50% | 50 | |
| 00000301 | Underwear | 10 | 0% | 32 | |
| 00001701 | Shirt | 6 | 10% | 15 | 00006401 (Frequency:15%) |
| 00006401 | Tie | 4 | 20% | 20 | 00001701 (Frequency:15%) |
| 00053101 | Desk | 0 | 100% | 0 | |
| : | : | : | : | : | : |

701 Discrimination ID
702 Classification
703 Put-on co-efficient
704 Put-off frequency
705 Put-on frequency
706 Pairing information

PERSONAL AUTHENTICATION SYSTEM

CLAIM OF PRIORITY

The present application claims priority from Japanese application P2004-171999, filed on Jun. 10, 2004, the content of which is hereby incorporated by reference into this application.

FIELD OF THE INVENTION

The present invention relates in general to security measures for limiting access to information and services, for each user, in connection with an information technology device or card, and, more specifically, the invention relates to a personal authentication system for use in identifying a user.

BACKGROUND OF THE INVENTION

Personal authentication is required for identification of persons as a protection against unauthorized access to information technology devices and the unauthorized utilization of card-based services. Conventionally, personal authentication has involved methods using passwords and personal identification numbers and biometric technologies using fingerprints and veins.

In general, personal authentication using related-art methods requires users to be authenticated again when a series of functions is used later after initial authentication because of timeouts due to the end of utilization by the user and the lapse of a predetermined time. This raises a problem in that password-based lock functions, such as those performed by information management, are actually not used when provided because users dislike the vexatious complication of personal authentication.

Some information technology devices have made available a device that functions as a dedicated key and provides a security function, such as preventing access to data on these information technology devices without that key device. In an example disclosed in Japanese Patent Laid-open No. 2003-288328, an explicit key device that allows radio frequency identification is held for personal identification.

Methods using such an explicit key suffer from the possibility of loss and theft of the key itself.

SUMMARY OF THE INVENTION

The present invention can simplify personal authentication, maintain security in information technology devices and cards, and save labor in performing personal authentication tasks by users.

RFID (radio frequency identification, radio tag) technologies have been designed for use in product distribution management and the like. An RFID tag responds to radio communication from an RFID reader and returns an inherent ID to the reader in the same way by radio. It is expected that RFID tags will be mounted in a wide variety of products from now on for purposes, such as distribution management, since they are very small and low-priced.

The present invention assumes that RFID tags are mounted on clothes and accessories that a user wears and that a combination of RFID tags are present around the user. Specifically, RFID information from a combination of RFID tags around the user is stored when the user's personal authentication is performed successfully in a conventional way. After that, the RFID tags are detected again in a situation where personal authentication is required. The continuous use of the previous personal authentication is acknowledged depending on the extent of coincidence between pieces of RFID information thus detected and a combination of the pieces of previous RFID information.

This saves labor required for personal authentication carried out by a conventional method, such as a password input, unless the combination of RFID tags that the user wears is changed by more than a predetermined amount. Unlike authentication using explicit keys, RFID uses a plurality of different RFID tags, which function as a key and which cannot be specified as a key, thus greatly reducing the possibility of incorrect use of personal authentication due to theft of a key.

DESCRIPTION OF THE PREFERRED EMBODIMENTS

Various embodiments of a personal authentication system according to the present invention will be described with reference to the drawings.

First Embodiment

Figure 1:
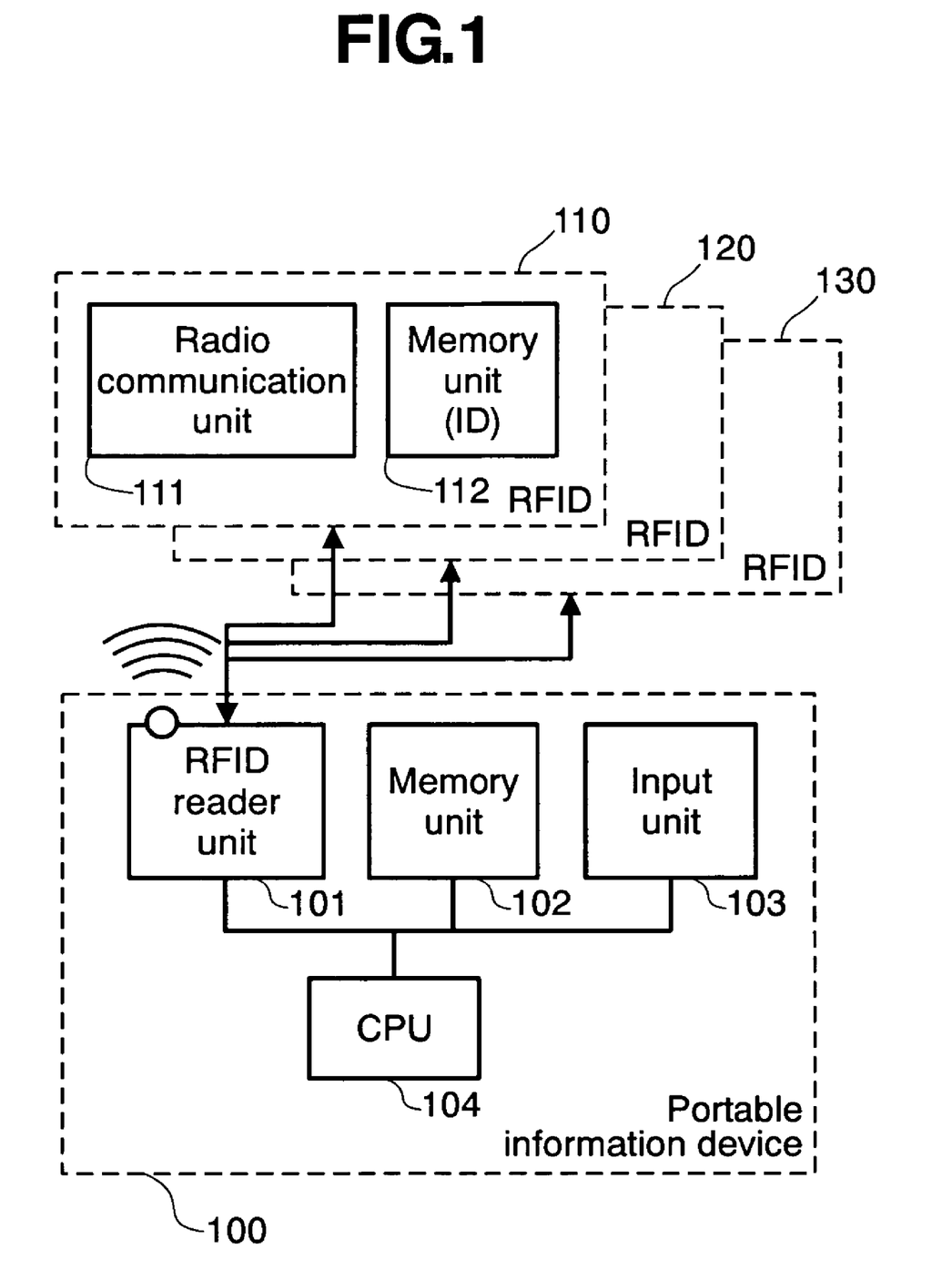
FIG. 1 is a block diagram which shows a system configuration of the present invention using a portable information device according to a first embodiment.
Figure 2:
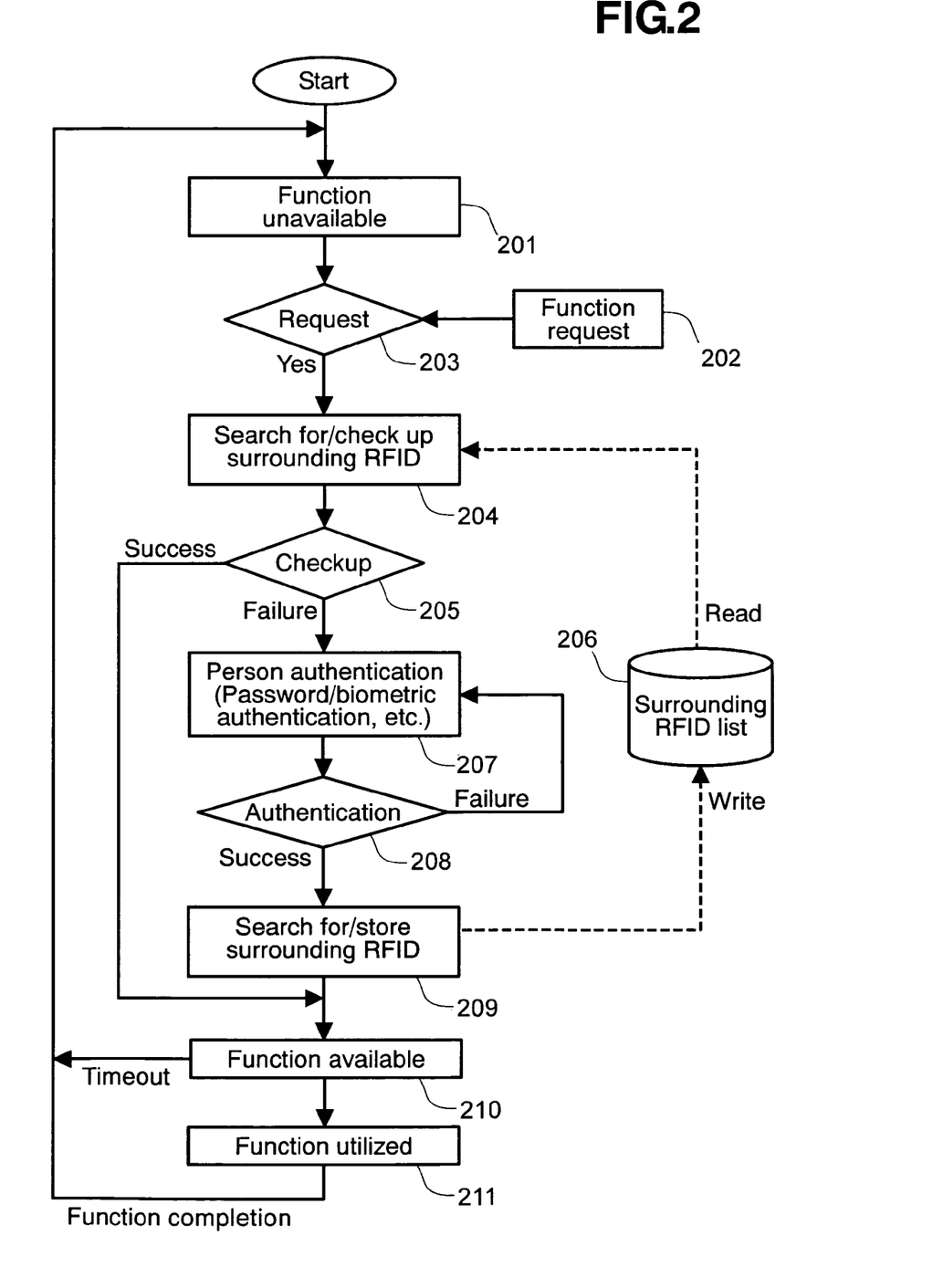
FIG. 2 is a flow chart which shows a data processing flow according to the first embodiment.

A first embodiment of a personal authentication system in accordance with the present invention will be described in detail with reference to FIGS. 1 and 2 of the drawings.

The first embodiment is an example of the present invention as applied to information protection for use in portable information devices, such as cellular phones and PDAs. FIG. 1 shows the overall configuration of a system that embodies the present invention. The system is composed of a portable information device 100, which includes an RFID reader unit 101, a memory unit 102, an input unit 103, and a CPU 104, and RFID tags 110, 120, 130 that can be detected by the RFID reader unit 101. The RFID reader unit 101 detects a plurality of RFID tags that are present therearound and performs a function for acquiring the inherent ID of each RFID tag. The RFID tag 110 has a radio communication unit 111 and a memory unit for storing an inherent ID, and it responds to radio communication from the RFID reader unit 101 on the portable information device 100, and returns the inherent ID. Although three RFID tags are shown, the number of RFID tags is not particularly limited. In the first embodiment, however, it is assumed that RFID tag 120 and RFID tag 130 are present, each of which has a configuration similar to RFID tag 110, but stores and a different ID, and each of these RFID tags is attached to a different article that a user wears.

An example of the operation of the present invention, in connection with the system configuration shown in FIG. 1, will be described with reference to the data processing flow shown in FIG. 2.

(1) After the system is started, an information protection function is set into operating, and the functions provided on the portable information device 100 become unavailable (step 201).

(2) The RFID reader unit 101 searches for RFID tags that are present therearound (step 204), in response to input of a user's function request (steps 202, 203), and it is assumed that RFID tags 110, 120, 130 are discovered.

(3) The inherent IDs of the RFID tags 110, 120, 130 detected at step 204 are checked against a list 206 of surrounding RFIDs recorded on the memory unit 102. If there is a coincidence between the IDs and the list, it is determined that personal authentication is successful, and steps 207, 208, and 209 are omitted. The processing then goes to step 210. However, when the device is in its initial state, the surrounding RFID list 206 is empty and this checkup fails.

(4) If the checkup at step 205 fails, personal authentication is required by use of a conventional login function, such as a password input through the input unit 103 (steps 207 and 208)

(5) If the personal authentication at step 207 is successful, the RFID reader unit 101 searches for RFID tags that are present therearound and records a result of this search in the surrounding RFID list 206 on the memory unit 102 (step 209). RFID tags 110, 120, 130 are detected at this time and their inherent IDs are recorded in the surrounding RFID list 206. Additionally, or optionally, person authentication establishment time is also recorded in a user surrounding RFID list and invalidated if a predetermined amount of time has elapsed.

(6) When the personal authentication at step 207 proves to be successful, any function requested by the user becomes available (step 210).

(7) If the user finishes utilizing the function(s) that the user has requested (step 211), or if a timeout occurs after the lapse of a predetermined time, the process proceeds to step 201, where the functions once again become unavailable.

(8) If the user inputs a function request again (step 202), the RFID tags 110, 120, 130, which were recorded in the surrounding RFID list 206 at step (5) above, are utilized in the checkup in steps 204 and 205. If, at the this, the existence of all of the RFID tags 110, 120, 130 can be confirmed in a group of RFID tags detected by the RFID reader unit 101 at step 204, it is determined that the checkup at step 205 is successful. This makes it possible to omit personal authentication by once again requiring a user's input (step 207). Conversely, if any of the RFID tags 110, 120, 130 is out of the range of the RFID reader unit 101, such as because an article with the RFID tag attached thereto has been removed and left behind, the checkup at step 205 fails.

The method used for the checkup at step 205 will be described in more detail. The purpose of the checkup is to identify a relevant user through the extent of coincidence with which a group of RFID tags (recorded in the surrounding RFID list 206) worn by the user at a previous successful personal authentication at step 207 is checked against a group of RFID tags which the user is wearing now. Therefore, the checkup requires more than one of the previous RFID tags. The more RFID tags provided, the more reliable the checkup is. In addition, if there are also a large number of RFID tags stored in the surrounding RFID list 206, it can be determined that the checkup is successful if, for example, up to 8 of the 10 such RFID tags provide for coincidence, rather than a complete coincidence as described above. A method can also be realized in which an effective period is set to the surrounding RFID list 206 and another personal authentication is required after the predetermined period of time expires.

Second Embodiment

Figure 3:
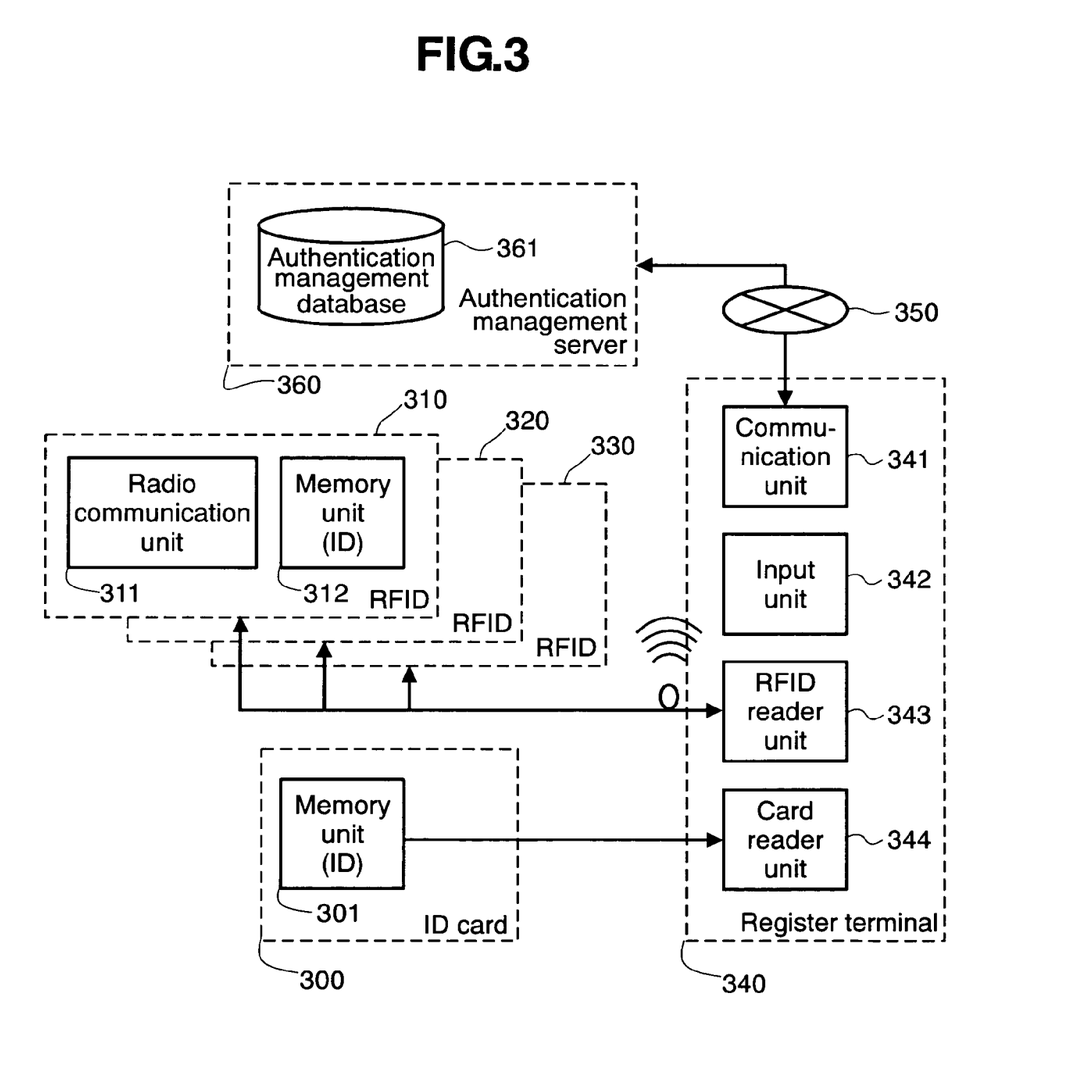
FIG. 3 is a black diagram which shows a system configuration of the present invention using an ID card according to a second embodiment.

The second embodiment is an example of the present invention as applied to the utilization of services, such as a payment that requires personal authentication, such as through use of a card having ID information. FIG. 3 shows the overall configuration of the system that embodies the present invention.

The system is composed of an ID card 300, RFID tags 310, 320, 330 that a user wears, a register terminal 340, and an authentication management server 360 connected via a network 350 to the terminal 340 for managing RFID authentication information. The ID card 300 has ID information stored in a memory unit 301.

The RFID tag has a radio communication unit 311 and a memory unit 312, and it transmits an inherent ID for response to a request from an RFID reader unit 343. This is also the case with the RFID tags 320 and 330. The register terminal 340 has a communication unit 341 for communicating with the authentication management server 360 via the network 350, an RFID reader unit 343 for detecting an RFID tag, and a card reader unit 344 for acquiring ID information that is stored on the ID card 300. The authentication management server 360 is provided with an authentication management database 361 and it manages authentication information.

Figure 4:
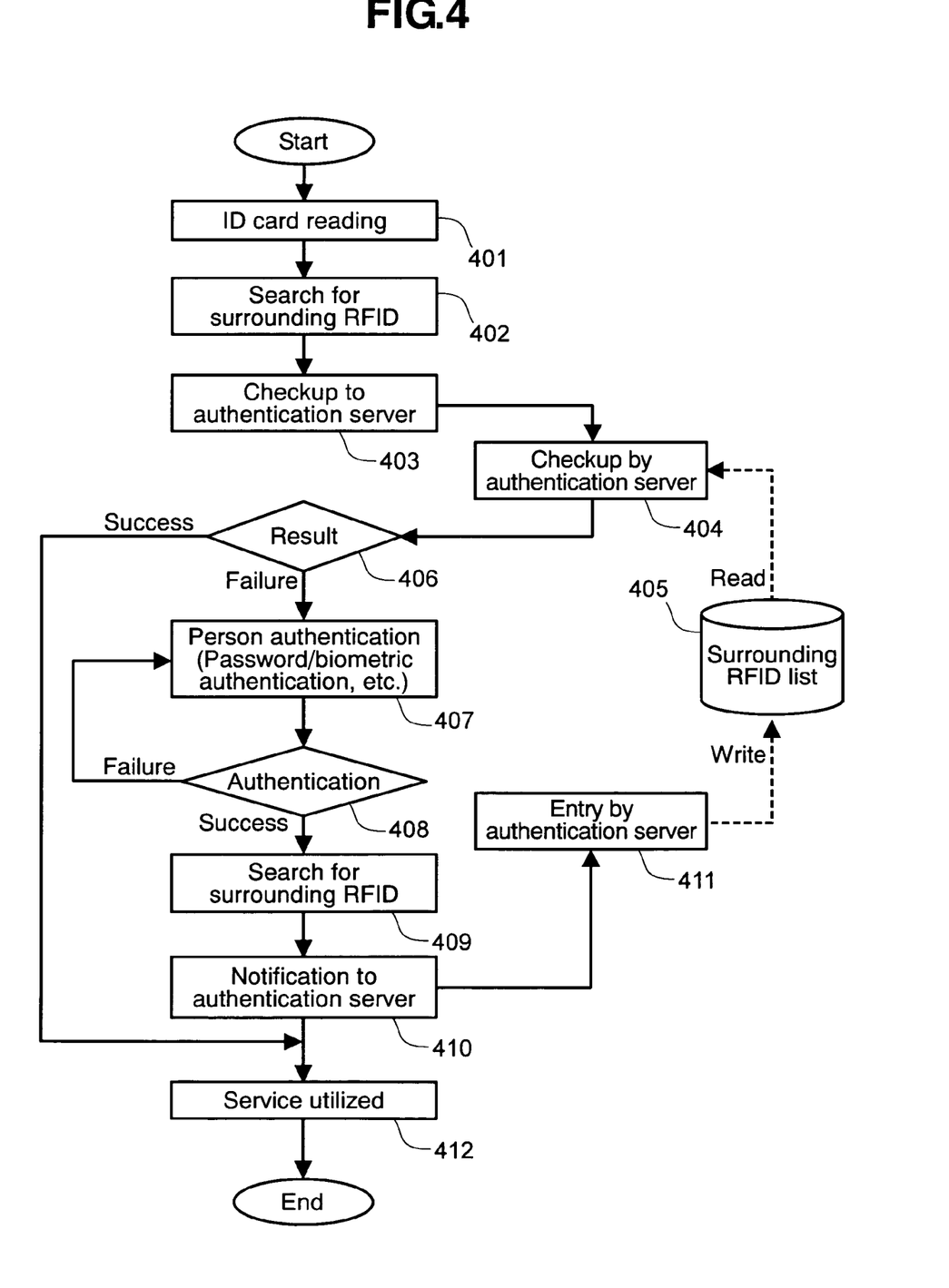
FIG. 4 is a flow chart which shows a data processing flow according to the second embodiment.

The embodiment of the present invention represented by the system in FIG. 3 will be described with reference to the data processing flow in FIG. 4.

(1) If a user has an ID card 300 and makes a service request, the card reader unit 344 in the register terminal 340 is used to read ID information from the memory unit 301 on the ID card (step 401).

(2) At the same time, the terminal uses the RFID reader unit 343 to search for RFID tags around the user (step 402), whereby the RFID tags 310, 320, 330 are detected.

(3) Based on the ID card information and RFID information acquired at steps 401 and 402, the terminal uses the communication unit 341 to send a checkup request to the authentication management server 360 via the network 350 (step 403).

(4) The authentication management server 360 reads out and checks a surrounding RFID list 405, which is stored in the authentication management database 361, corresponding to the ID card information transmitted from the register terminal 340, with RFID information transmitted from the register terminal 340, which is a list of inherent IDs of the RFID tags 310, 320, 330 used in the second embodiment. The server 360 then returns a result via the network 350 to the register terminal 340 (step 404). The means used for this checkup is the same as that used for the first embodiment.

(5) The register terminal 340 responds to the result returned from the authentication management server 360; and, if the personal authentication is successful, service utilization is made available without another personal authentication. If the personal authentication is unsuccessful, password input via an input unit 342 and/or biometric authentication must take place for personal authentication (step 406, 407, 408).

(6) If the personal authentication at step 407 proves to be successful, a search for a surrounding RFID tag takes place (step 409), and then a list of RFID tags that the user is wearing and ID information relating thereto are registered with the authentication management server (step 410, 411)

(7) If the terminal receives a result that has been acquired at step 406 or 408 and the personal authentication proves to be successful, the terminal makes service utilization available (step 412).

The authentication management server 360 manages an RFID list for each ID card (for each ID card number) that an individual user has and communicates with a plurality of register terminals 340 via the network 350, for example. Some register terminal 340 may perform personal authentication on a user, and a result of the personal authentication, that is, a list of RFID tags disposed around the user, may also be referred to by another register terminal 340. If personal authentication, such as by password input, is successful on one register terminal, password input and the like is omitted on all register terminals as long as RFID authentication according to the present invention is established.

Third Embodiment

A method for performing RFID-based authentication in accordance with the present invention has been described as a first embodiment in terms of a combination with another means of authentication, such as password input and biometric authentication. In the third embodiment, a method for utilizing personal authentication based on location information and connection information will be described in terms of basic authentication using the other means described above. The third embodiment will be described in detail with reference to FIG. 5.

Figure 5:
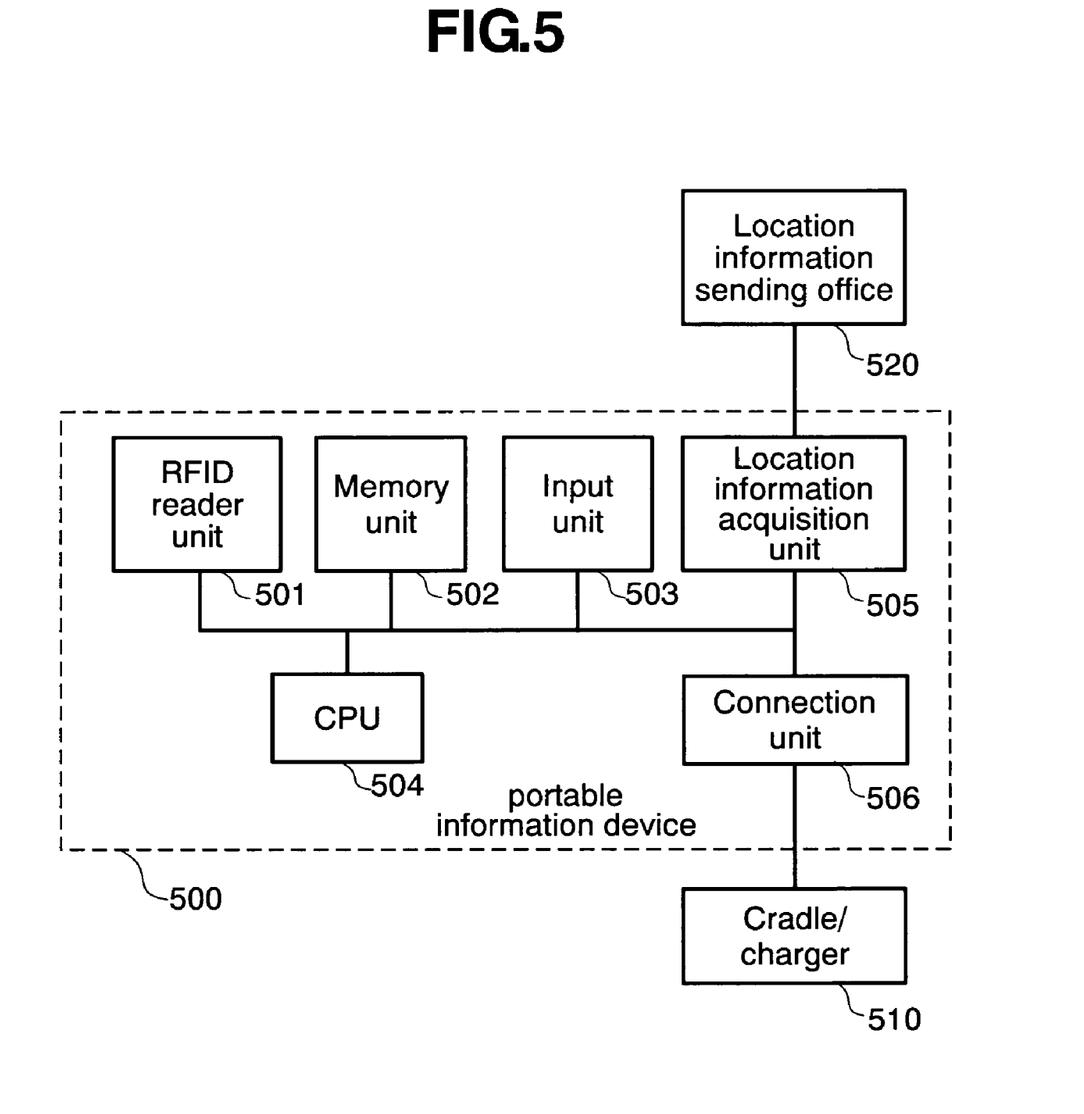
FIG. 5 is a block diagram which shows a system configuration for personal authentication using location/connection information according to a third embodiment.

In FIG. 5, a portable information device 500, as in the configuration described for the first embodiment, is composed of an RFID reader unit 501, a memory unit 502, an input unit 503, and a CPU 504. The portable information device also includes a connection unit 506 that is connected to a location information acquisition unit 505 for receiving information from a location information sending office 520 and acquiring the location of the portable information device, or to a cradle/charger 510 for performing communication and charging.

In the third embodiment, it is assumed that a user is in a place, such as his house or office, having security and where a high possibility of personal authentication can be established. The portable information device 500 registers beforehand a place where some extent of such security is ensured (the location of a user's house and office). A new list of RFID tags that a user holds is recorded on the memory unit 502 if the location information acquisition unit 505 confirms that the portable information device 500 is in the above-mentioned place that has been registered beforehand.

Although a new RFID list can be created and recorded, as in the first embodiment, an RFID list for personal authentication can be created in the third embodiment with a higher level of reliability than in the first embodiment. This is because the RFID list is created and recorded in a place where some extent of security is ensured, that is, a place where the user him/herself is present with a high level of probability. This makes it possible to maintain location-based personal authentication even after the user goes out.

For personal authentication, the portable information device can also continue to detect RFID tags at predetermined time intervals while the user is at his/her home or office. However, the information thus acquired will be meaningless if the user does not wear the device. Therefore, RDIF tags are detected when the device is disconnected from the cradle/charger 510 and when the user has the device, such as when the user leaves his/her house or office, thereby allowing an RDID list to be created and recorded that will provide personal authentication with a higher level of reliability.

In addition, the cradle/charger 510 itself is provided with an inherent ID that allows the portable information device to make a personal authentication, thus making it possible to confirm the connection between the device and a specific cradle or charger at the connection unit 506. Personal authentication can be confirmed with the connection if the user places his/her cradle or charger together with the portable information device in a safe place, such as his/her house or office, without carrying them with him/her. RFID tags are detected and recorded when the portable information device is connected to or disconnected from the cradle or charger, thus making it possible to maintain the personal authentication that is already available.

Similarly, it is reasonable that, if a portable information device is connected via a cradle and the like to a personal computer and the like, a portable information device user will be identified when the device becomes connected to the specific personal computer. For this purpose, a corresponding personal computer is registered with the portable information device in advance. If it is confirmed that the device is connected to the computer, it can be determined that a basic personal authentication has been established. In this case, user authentication on the personal computer can also be reflected for personal authentication on the portable information device.

The data processing flow for the embodiment described above will be described with reference to FIG. 6.

Figure 6:
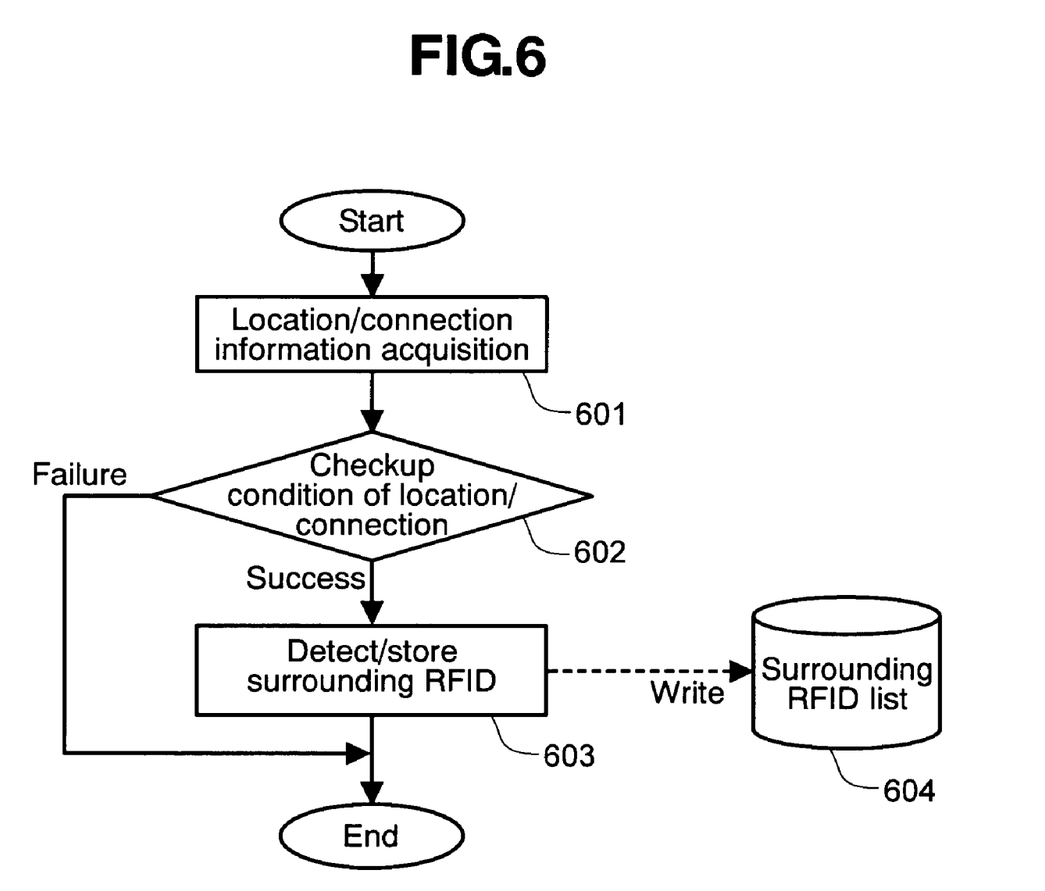
FIG. 6 is a flow chart which shows a data processing flow according to the third embodiment.

(1) The location information acquisition unit 505 or cradle/charger 510 acquires location/connection information (step 601).

(2) The location/connection information thus acquired is checked against the location or connection requirements that were registered with the portable information device 500 in advance (step 602). If the checkup is unsuccessful, no processing is permitted and the process ends.

(3) If the checkup is successful, surrounding RFID tags are detected, and the result is recorded in a surrounding RFID list 604 stored in the memory unit 502 (step 603).

If personal authentication is required, the RFID list 604 that has been stored is used for authentication, as in the first embodiment. In the third embodiment, personal authentication can be provided with a higher level of reliability because an RFID list is created based on RFID tags that have been detected in a secure place registered in advance, as described above.

Fourth Embodiment

In a fourth embodiment, authentication is provided by checking an RFID tag that was detected at the time of authentication against an RFID list that is available when basic personal authentication is established. As described in the first to third embodiments, methods for RFID list checkup include methods available for using the number of RFID tags that are coincident with the RFID list and the rate of coincidence. In the fourth embodiment, however, an archive is left when an RFID list is recorded or checked; RFIDs, a RFID combination frequency, and checkup failures and successes are accumulated; and frequency information for these items is reflected on checkup weighting. This is intended to provide a checkup with a higher level of reliability.

A previous RFID tag mounting frequency is multiplied by a corresponding weighted coefficient for each article provided with RFID tags that is subjected to a checkup, for example. If the total sum of calculations thus obtained exceeds a predetermined threshold, it is determined that the personal authentication is successful. This allows personal authentication to be provided with a higher level of reliability.

The method described in connection with the fourth embodiment uses RFID tags that are attached to articles that a user wears, such as clothing and accessories. In addition, these individual RFID tags have different inherent IDs. An archive kept when an RFID list is recorded shows the user's taste. An archive for his/her favorite hat, for example, will show a high frequency at which the hat is worn. The more often the hat is coordinated with a particular shirt-scarf combination, the more often the shirt-scarf pair will appear in the archive.

In the fourth embodiment, reference is made to a past archive when an RFID list is created. A weighted coefficient is then calculated based on the put-on frequency (put-on archive) in terms of a single article relative to a user's taste with an RFID tag attached thereto and a combination of such articles each having an RFID tag attached thereto. The utilization of the weighted coefficient provides for an increase in checkup reliability. Weighted coefficients may be calculated dynamically based on archive information, such as the put-on frequency. The reliability of personal authentication can be improved even by setting a weight for each RFID tag in advance.

An archive can also be created for checkup successes and failures on the basis of each RFID tag contained in an RFID list. In the fourth embodiment, RFID tags worn by a user will be detected. However, there are cases where a user takes off an article having an RFID tag at some time even if he/she was wearing the article at the time of basic personal authentication and RFID list creation, thus resulting in a reduction in the rate of coincidence afterwards.

As described previously, checkup successes and failures accumulated for each RFID tag in an RFID list provide degrees of the reliability of each RFID tag attached to an article worn by a user. Even some articles of apparel, such as hats, for example, are not necessarily worn by users indoors, while other articles, such as underwear, are not very often taken off once worn. The reliability of checkups can be improved by accumulating this tendency, that is, retaining and accumulating checkup archives for each RFID tag and by setting a low checkup weight value for RFID tags for articles that are often taken off and high value for those for article that are not so often taken off.

As hats and underwear are given above as examples, how often a user wears an article (the put-on coefficient) can be estimated, depending on what article an RFID tag is attached to, and preset as a weighted parameter. Inherent RFID tag IDs are managed in a unique manner and a relevant database is retrieved, thereby making it possible to obtain information about what article an RFID tag is attached to.

When an RFID list is created, a search is made to determine what article each RFID tag is attached to. A coefficient (put-on coefficient) is then calculated as a wearing-article classification characteristic in advance for showing how often each article is worn per day for weighting purposes. This makes it possible to improve the reliability of checkups as with checkups based on results of analyses of archive information on checkup successes and failures. It is also possible for RFID tags to be attached to articles such as desks and chairs. This information (put-on coefficient) can also be used to eliminate such non-wearing articles. Such a method for utilizing the coefficient allows noise information to be deleted for detected RFID tags attached to an individual's non-wearing articles.

Figure 7:
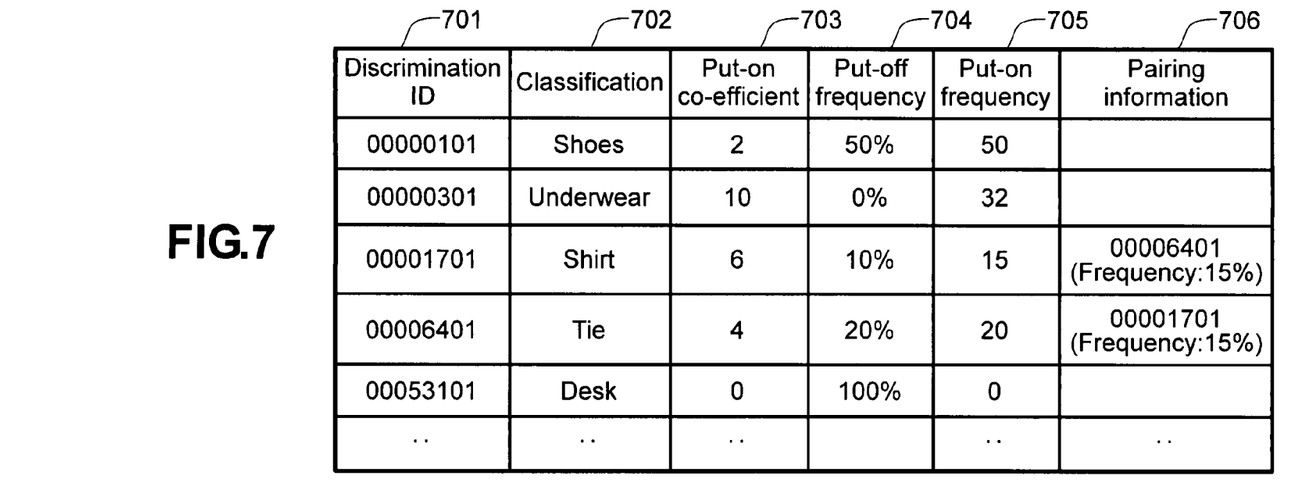
FIG. 7 is a table which shows an example of an RFID archive according to a fourth embodiment.

FIG. 7 shows an example of an archive information table for an RFID list according to the present invention. The RFID list according to the fourth embodiment holds RFID tag discrimination IDs. Corresponding RFID list archives are accumulated to create archive information. The information shown contains the classifications 702 of an article retrievable by matching with a RFID tag discrimination ID 701, a put-on coefficient 703, which is a put-on extent evaluated by the time axis for each classification, a put-off (take-off) coefficient 704, which is a dynamic measurement of the take-off frequency from previous archives for each classification, and a put-on frequency 705, which is a put-on frequency evaluated by the frequency axis for each discrimination ID.

The RFID list according to the fourth embodiment also includes pairing information in which a record is made of two or more combinations of forms detected when one RFID list is created. The put-on coefficient 703 for each classification, the put-off frequency 704 for each classification (Its opposite counterpart, that is, the put-on frequency 705 for each classification can be used. The same is the case with the items given below), the put-on frequency 705 for each discrimination ID, and each weighted coefficient for the pairing information 706, may be in any form if one or more forms are used. In addition, the put-off frequency 704 is dynamically managed based on an archive, and it functions as an evaluation index of nature that varies with changes in an individual's living habits. Personal authentication with a high level of reliability can be provided for that individual by using this weighted coefficient together with the put-on coefficient 703 (static coefficient).

The put-on frequency 705 is a dynamic weighted coefficient evaluated with an absolute number of times for each discrimination ID. An evaluation can be made of a weighting integrating a time-axis evaluation and a frequency-axis evaluation by using the dynamic weighted coefficient with the put-on coefficient 703 (static coefficient), thus making it possible to provide a personal authentication with a higher level of accuracy. In addition, the put-on frequency 705 is reset for all discrimination IDs after the lapse of a predetermined period (effective time limit) and for discrimination IDs that have not been counted during the predetermined period. This makes it possible to extract and utilize a very reliable archive portion from the archive information for personal authentication with a higher level of reliability.

Figure 8:
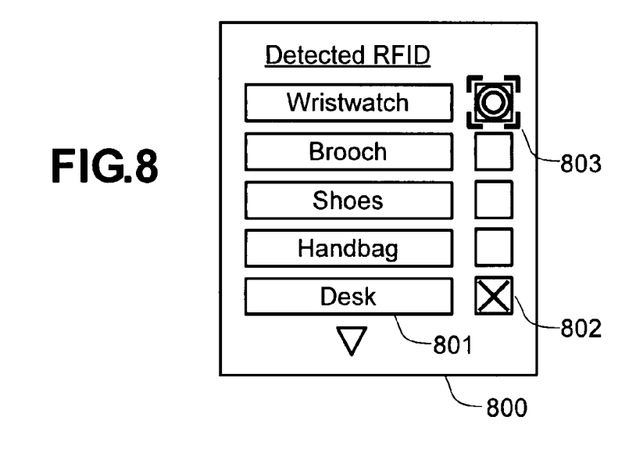
FIG. 8 is a diagram which shows an operation screen for additional weighted information for RFID checkup according to the fourth embodiment.

Weighting and pairing information for RFID tag checkups, as described in the fourth embodiment, in addition to its automatic detection from the archive, can be registered in advance through operations on the terminal screen. FIG. 8 shows an example of a screen configuration for setting the above-mentioned information on a terminal screen. A list 801 of RFID tags detected around a user is displayed on a screen 800 of a portable information device and a weight setting condition 802 of a weighted coefficient for a checkup is displayed for each of the RFID tags detected. The user can use the cursor 803 on the screen to designate and make a change to a weighted coefficient (such as the put-on coefficient 703) for any of the RFID tags detected.

FIG. 8 shows an example of instructions created for a checkup. In this case, X is entered in the square next to Desk, a non-wearing article, to create an instruction for not using the article for a checkup. A double circle is entered next to a favorite Wristwatch to create an instruction for a preferential weighting for a checkup. As described above, the reliability of checkups can be improved by selecting articles worn by a user based on his/her own taste. In this example, symbols are used to indicate levels of priority. However, numeric values can also be used to designate levels of priority for achieving a finer priority setting. In FIG. 7, the put-on coefficient for the classification "Desk" is "0" and so is the put-on frequency. This indicates that the user has set the put-on coefficient 703 for the classification "Desk" to "0", as exemplified in FIG. 8, and that, even if discrimination ID "00053101" (classification: desk) is detected at the time of RFID tag detection, the desk is determined to be a non-wearing article, that is, it is determined to be not covered by an archive and not counted.

According to the fourth embodiment, it is required that the user should perform a conventional login operation the first time he/she utilizes a portable information device. After that, however, articles that he/she wears (personal belongings) are identified for automatic authentication by the time he/she logs out. This eliminates the necessity of the user inputting a password and the like at different times, thus making it possible for him/her to continue to utilize his/her portable information device.

In addition, if the rate of checkup coincidence is nearly 100% in a personal authentication using an RFID list according to the present invention (equal to or greater than a predetermined threshold), a conventional login operation can be omitted the next time a user logs in. Personal authentication using an RFID list according to the present invention can be utilized widely in situations where there is a demand for security based on personal authentication.

Having described a preferred embodiment of the present invention with reference to the accompanying drawings, it is to be understood that the invention is not limited to the embodiments described herein and that various changes and modifications could be effected therein by one skilled in the art without departing from the spirit or scope of the invention, as defined in the appended claims.

What is claimed is:

1. A person authentication apparatus having a memory unit, a processing unit and a login function, said apparatus comprising:
   a reader unit for reading radio tag information on a radio tag that is present therearound;
   wherein:
      said processing unit checks up information from a plurality of radio tags detected by said reader unit with a list concerning radio tag information on personal belongings acquired at the time of login,
      said list has a weighted coefficient showing an extent of time length at which an RFID tag is mounted for each personal belonging classification,
      a login state is adapted to be held in the case where an extent of check-up coincidence meets a predetermined reference value, and
      the calculation of said extent of check-up coincidence is performed by means of an operation using said weighted coefficient.

2. A person authentication apparatus having a memory unit, a processing unit and a login function, said apparatus comprising:
   a reader unit for reading radio tag information on a radio tag that is present therearound;
   wherein:
      said processing unit checks up information from a plurality of radio tags detected by said reader unit with a list concerning radio tag information on personal belongings acquired at the time of login,
      said list has a weighted coefficient showing an extent of time length at which an RFID tag is mounted for each personal belonging classification,
      the person authentication is determined to be successful in the case where an extent of check-up coincidence meets a predetermined reference value, and
      the calculation of said extent of check-up coincidence is performed by means of an operation using said weighted coefficient.

3. A portable information device having a memory unit, a processing unit, and a login function, said device comprising:
   a reader unit for reading radio tag information on a radio tag that is present therearound;
   wherein:
      said processing unit checks up information from a plurality of radio tags detected by said reader unit with a list concerning radio tag information on personal belongings acquired at the time of login,
      said list has a weighted coefficient showing an extent of time length at which an RFID tag is mounted for each personal belonging classification,
      a login state is adapted to be held in the case where an extent of check-up coincidence meets a predetermined reference value, and
      the calculation of said extent of check-up coincidence is performed by means of an operation using said weighted coefficient.

4. A portable information device having a memory unit, a processing unit, and a login function, said device comprising:
   a reader unit for reading radio tag information on a radio tag that is present therearound;
   wherein:
      said processing unit checks up information from a plurality of radio tags detected by said reader unit with a list concerning radio tag information on personal belongings acquired at the time of login,
      said list has a weighted coefficient showing an extent of time length at which an RFID tag is mounted for each personal belonging classification,
      the person authentication is determined to be successful in the case where an extent of check-up coincidence meets a predetermined reference value, and
      the calculation of said extent of check-up coincidence is performed by means of an operation using said weighted coefficient.

5. The person authentication apparatus according to claim 1, further comprising a location information acquisition unit, wherein when location information acquired by said location information acquisition unit coincides with location information registered in advance or is contained in a range of the location information registered in advance, said reader unit acquires radio tag information on a radio tag that is present therearound and creates said list, based on corresponding information acquired.

6. The person authentication apparatus according to claim 2, further comprising a location information acquisition unit, wherein when location information acquired by said location information acquisition unit coincides with location information registered in advance or is contained in a range of the location information registered in advance, said reader unit acquires radio tag information on a radio tag that is present therearound and creates said list, based on corresponding information acquired.

7. The portable information device according to claim 3, further comprising a location information acquisition unit, wherein when location information acquired by said location information acquisition unit coincides with location information registered in advance or is contained in a range of the location information registered in advance, said reader unit acquires radio tag information on a radio tag that is present therearound and creates said list, based on corresponding information acquired.

8. The portable information device according to claim 4, further comprising a location information acquisition unit, wherein when location information acquired by said location information acquisition unit coincides with location information registered in advance or is contained in a range of the location information registered in advance, said reader unit acquires radio tag information on a radio tag that is present therearound and creates said list, based on corresponding information acquired.

9. A person authentication system having a login function and an ID card reader unit, said system comprising:
   a reader unit for reading radio tag information on a radio tag that is present therearound when said ID card reader unit detects an ID card;
   a communication unit connectable via a network to an authentication management server having a memory unit;
   a function for transmitting information from a plurality of radio tags read by said reader unit from said communication unit to said authentication management server;
   a function for receiving a person authentication result by checking up a list concerning radio tag information on personal belongings held in said memory unit of said authentication management server and managed for each ID number of an ID card with said plurality pieces of radio tag information; and
   a function for holding a login state or determining that person authentication is successful when an extent of check-up coincidence in said person authentication result meets a predetermined reference value;
   wherein said list has a weighted coefficient showing an extent of time length at which an RFID tag is mounted for each personal belonging classification.

10. A person authentication system having a person authentication apparatus having a login function and an ID card reader unit connected via a network to an authentication management server having a memory unit, wherein said person authentication apparatus comprises:
   a reader unit for reading radio tag information on a radio tag that is present therearound when said ID card reader unit detects an ID card; and
   a communication unit connectable via a network to said authentication management server; and
   said authentication management server comprises:
   said memory unit for storing a list concerning radio tag information on personal belongings managed for each ID number of an ID card,
   a function for transmitting information from a plurality of radio tag information read by said reader unit from said communication unit to said authentication management server; and
   a function for checking said plurality of pieces of radio tags with said list by said authentication management server and holding a login state or determining that person authentication is successful when an extent of check-up coincidence meets a predetermined reference value;
   wherein said list has a weighted coefficient showing an extent of time length at which an RFID tag is mounted for each personal belonging classification.

11. The person authentication apparatus according to claim 1, wherein person authentication establishment time is also recorded in a user surrounding RFID list and invalidated due to a lapse of a predetermined time.

12. The person authentication apparatus according to claim 2, wherein person authentication establishment time is also recorded in a user surrounding RFID list and invalidated due to a lapse of a predetermined time.

13. The person authentication apparatus according to claim 1, wherein:
   said weighted coefficient is static;
   said list has a dynamic weighted coefficient showing an extent of frequency at which an RFID tag is mounted for each personal belonging classification; and
   the calculation of said extent of check-up coincidence is performed by means of an operation using said two classifications of said weighted coefficients.

14. The person authentication system according to claim 2, wherein;
   said weighted coefficient is static;
   said list has a dynamic weighted coefficient showing an extent of frequency at which an RFID tag is mounted for each personal belonging classification, and
   the calculation of said extent of check-up coincidence is performed by means of an operation using said two classifications of said weighted coefficients.

15. The portable information device according to claim 3, wherein:
   said weighted coefficient is static;
   said list has a dynamic weighted coefficient showing an extent of frequency at which an RFID tag is mounted for each personal belonging classification, and
   the calculation of said extent of check-up coincidence is performed by means of an operation using said two classifications of said weighted coefficients.

16. The portable information device according to claim 4, wherein:
   said weighted coefficient is static;
   said list has a dynamic weighted coefficient showing an extent of frequency at which an RFID tag is mounted for each personal belonging classification, and
   the calculation of said extent of check-up coincidence is performed by means of an operation using said two classifications of said weighted coefficients.

17. The person authentication apparatus according to claim 1, wherein:
   said weighted coefficient is static;
   said list has a weighted coefficient based on the number of times at which an RFID tag is mounted for each personal belonging ID, and the calculation of said extent of check-up coincidence is performed by means of an operation using said two classifications of said weighted coefficients.

18. The person authentication apparatus according to claim 2, wherein:

said weighted coefficient is static;

said list has a weighted coefficient based on the number of times at which an RFID tag is mounted for each personal belonging ID, and the calculation of said extent of check-up coincidence is performed by means of an operation using said two classifications of said weighted coefficients.

19. The portable information device according to claim 3, wherein:

said weighted coefficient is static;

said list has a weighted coefficient based on the number of times at which an RFID tag is mounted for each personal belonging ID, and the calculation of said extent of check-up coincidence is performed by means of an operation using said two classifications of said weighted coefficients.

20. The portable information device according to claim 4, wherein:

said weighted coefficient is static;

said list has a weighted coefficient based on the number of times at which an RFID tag is mounted for each personal belonging ID, and the calculation of said extent of check-up coincidence is performed by means of an operation using said two classifications of said weighted coefficients.

* * * * *